United States Patent [19]
Essert et al.

[11] Patent Number: 6,095,330
[45] Date of Patent: Aug. 1, 2000

[54] LIGHT-TIGHT PACKAGING ENTITY FOR STRIP-SHAPED LIGHT SENSITIVE MATERIAL

[75] Inventors: Hermann August Essert, Dieburg; Steffen Peter Mühlbach, Egelsbach, both of Germany

[73] Assignee: Agfa-Gevaert N.V., Belgium

[21] Appl. No.: 09/342,652

[22] Filed: Jun. 29, 1999

[30] Foreign Application Priority Data

Jul. 10, 1998 [DE] Germany .................. 198 30 954

[51] Int. Cl.⁷ ................................. B65D 85/67
[52] U.S. Cl. ..................... 206/410; 53/442; 206/416
[58] Field of Search .................. 206/407, 410, 206/411, 413, 414, 415–416, 455, 484, 497, 398; 53/441, 442, 419

[56] References Cited

U.S. PATENT DOCUMENTS

| | | |
|---|---|---|
| 4,148,395 | 4/1979 | Syracuse et al. . |
| 4,505,387 | 3/1985 | Sero . |
| 5,353,933 | 10/1994 | Takahashi et al. ............ 206/410 |
| 5,462,164 | 10/1995 | Cornelissen et al. .......... 206/413 |
| 5,472,089 | 12/1995 | Specogna et al. ............. 206/410 |
| 5,492,221 | 2/1996 | Light et al. .................... 206/410 |
| 5,526,930 | 6/1996 | Spina et al. ................... 206/414 |
| 5,738,210 | 4/1998 | Kausch et al. ................ 206/410 |
| 5,941,387 | 8/1999 | Rasel ............................. 206/413 |

FOREIGN PATENT DOCUMENTS

| | | |
|---|---|---|
| 0 181 417 | 5/1986 | European Pat. Off. . |
| 0 488 738 B1 | 6/1992 | European Pat. Off. . |
| 0 536 608 B1 | 4/1993 | European Pat. Off. . |
| 0 632 322 B1 | 1/1995 | European Pat. Off. . |
| 0 786 695 | 7/1997 | European Pat. Off. . |
| 9704358 | 3/1997 | WIPO . |

*Primary Examiner*—Paul T. Sewell
*Assistant Examiner*—Luan K. Bui
*Attorney, Agent, or Firm*—Connolly Bove Lodge & Hutz

[57] ABSTRACT

A light-tight packaging entity includes rigid side covers (4) and a flexible light-tight covering film (3), which envelops the curved surface of a file roll (1) and is shrunk onto outer edges (5) of the side covers (4) to keep incident light away. This packaging entity makes it possible to achieve reliable protection from light with a packaging entity of small size, ensures unimpeded rewinding of the film, and enables the light-sensitive material to be handled in daylight. The present packaging entity is space-saving, capable of being rewound, leaves no packaging residues in the processing device after opening and unrolling have taken place, and in addition is simple and cost-effective.

15 Claims, 5 Drawing Sheets

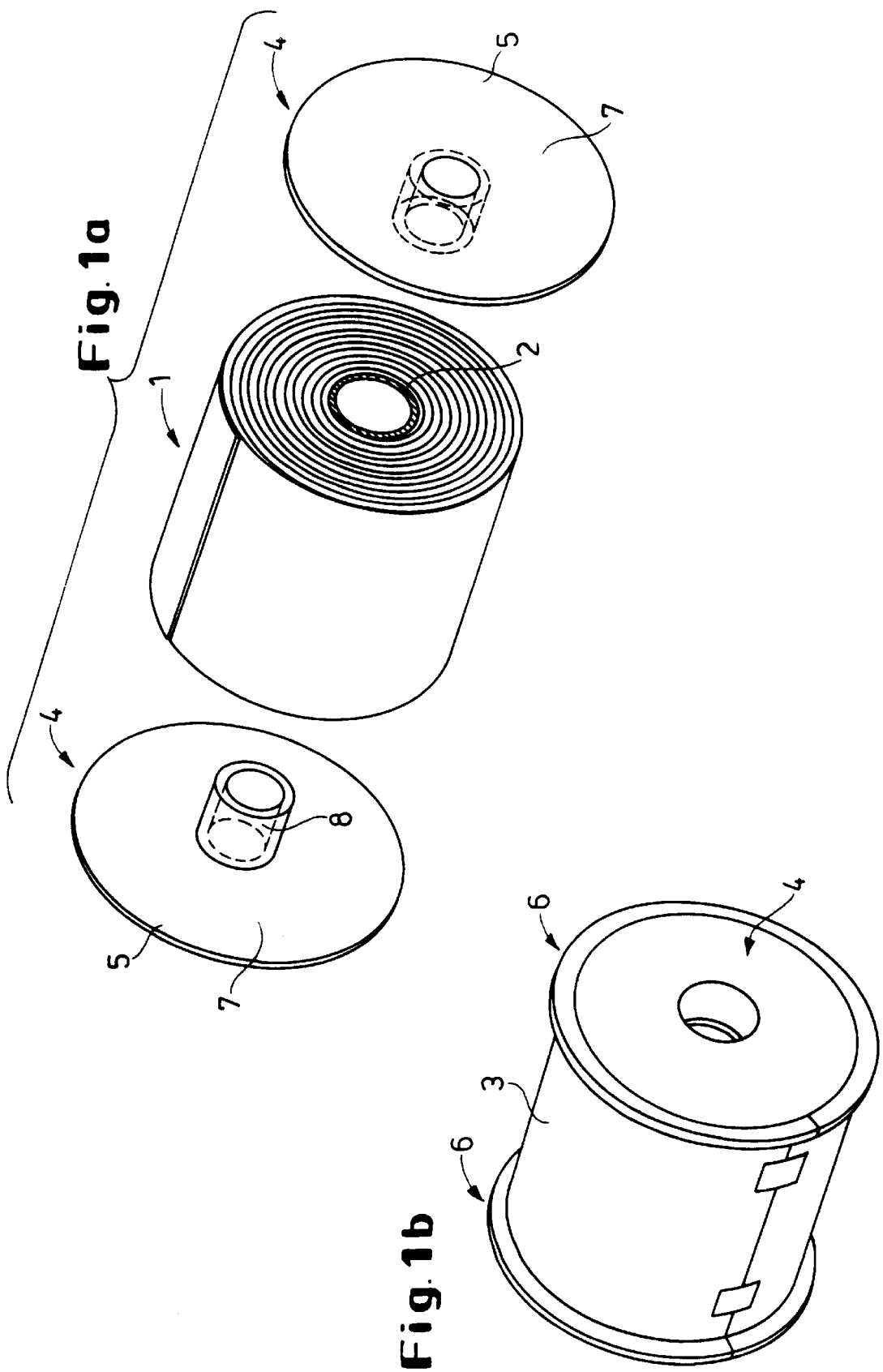

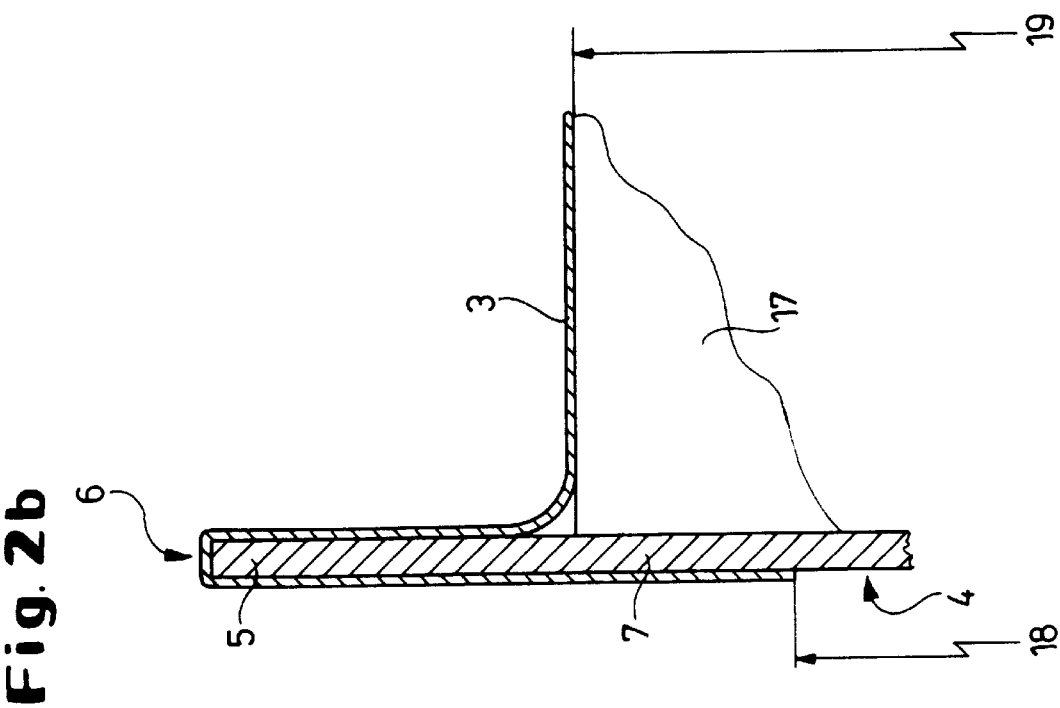
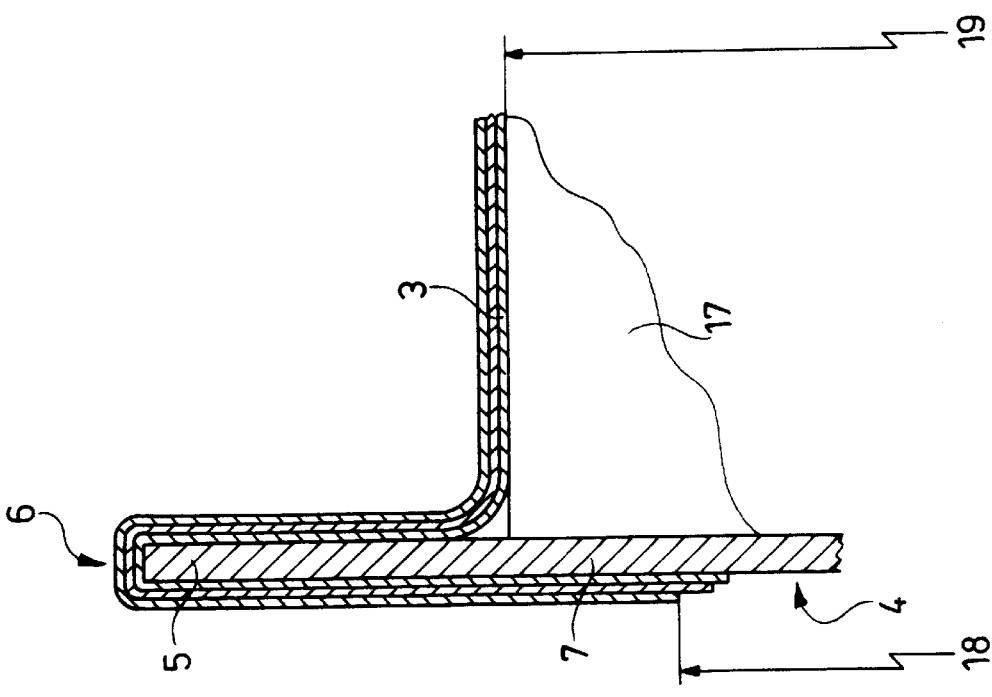

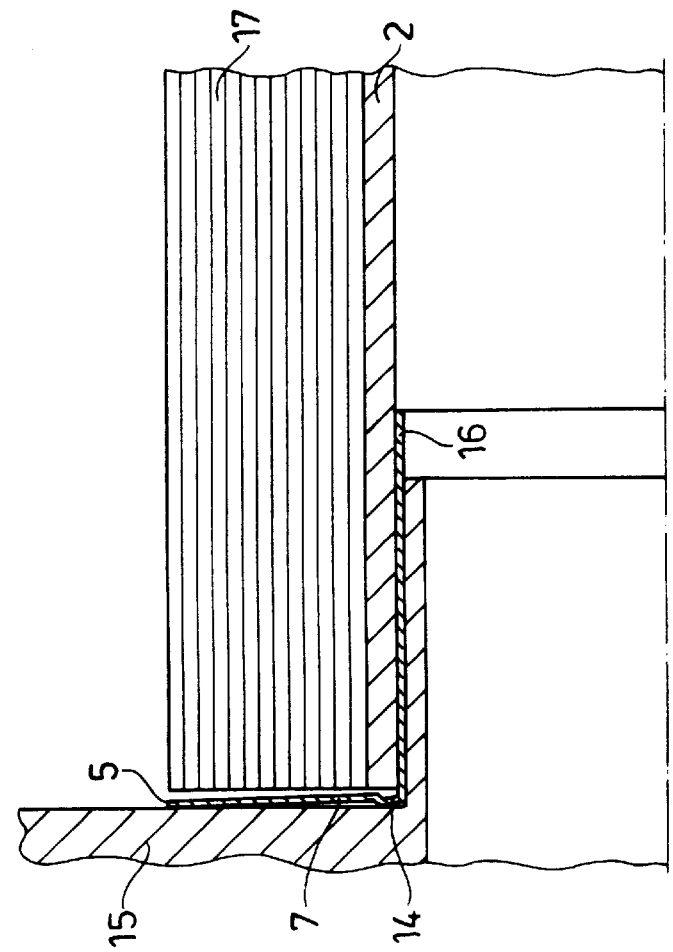
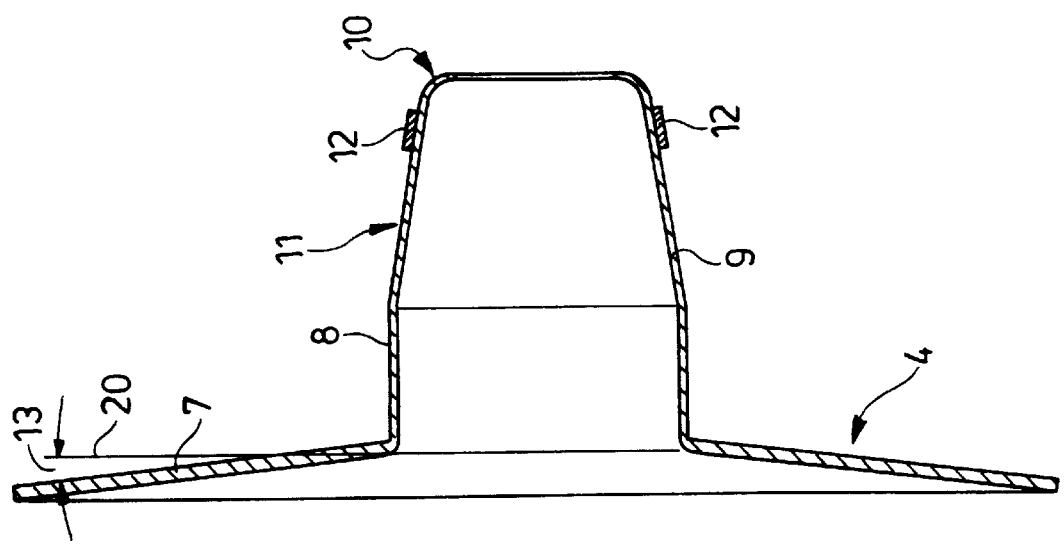

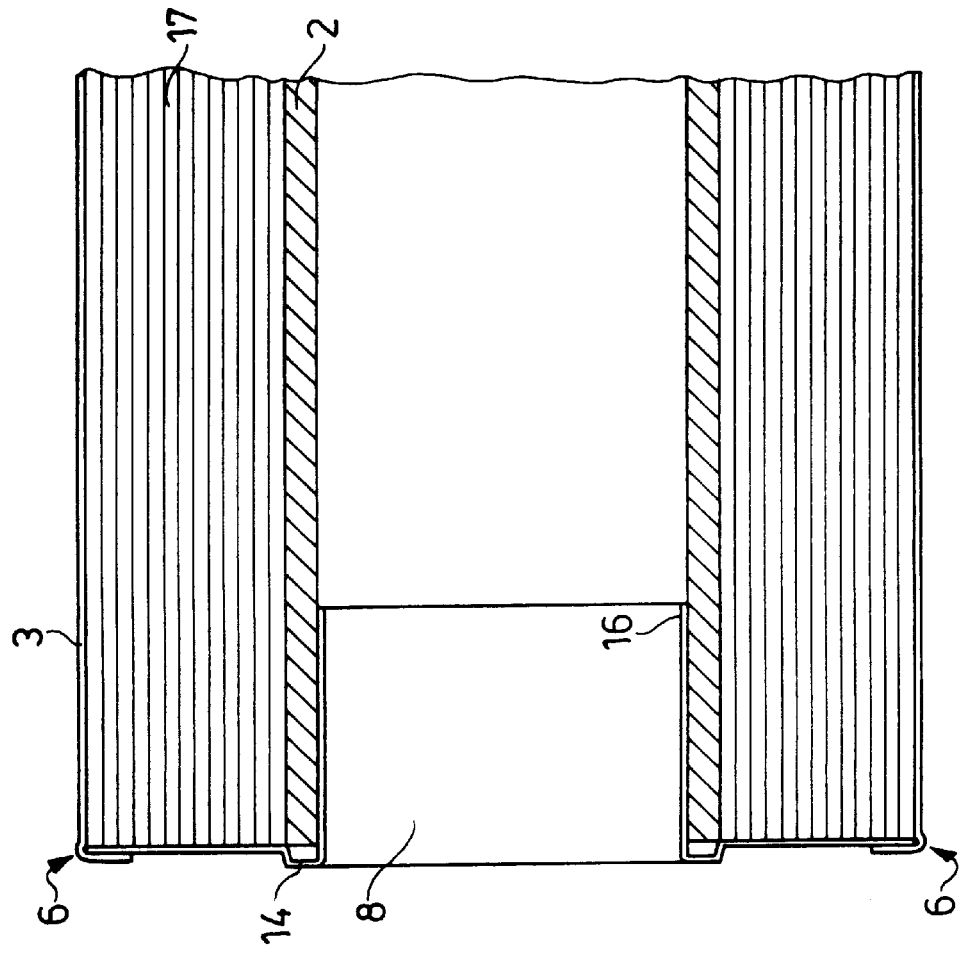
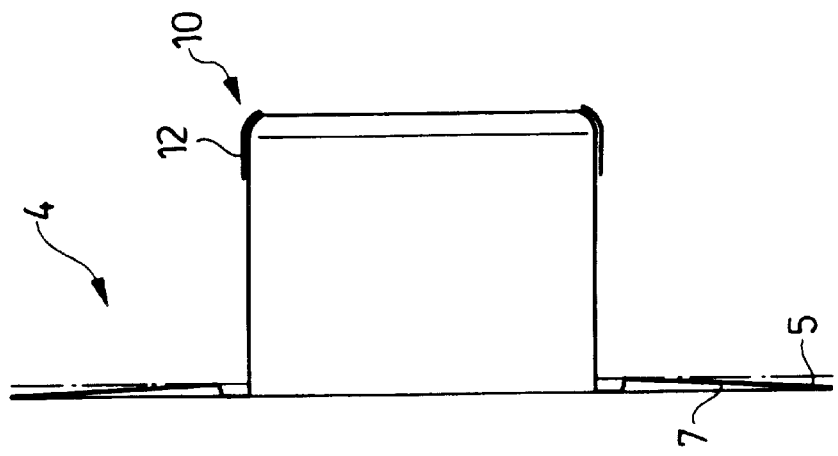

LIGHT-TIGHT PACKAGING ENTITY FOR STRIP-SHAPED LIGHT SENSITIVE MATERIAL

This invention relates to a light-tight packaging entity for strip-shaped light-sensitive material according to the, and to a process for producing a light-tight packaging entity.

Light-tight packaging entities ensure the usability of light-sensitive material, for example photographic paper or photographic film material, until they are processed in a processing device. They protect the light-sensitive material, hereinafter abbreviated to photographic film material, from unwanted exposure, from moisture and from mechanical damage.

One common form of packaging entity for strip-shaped photographic film material is what is termed the wound roll, in which the photographic film material is wound round a winding tube and is protected in a light-tight manner by an enveloping covering film and optionally by two side covers. What are termed daylight packaging entities, which permit a film to be changed in the light, have been successfully introduced on to the market. In this type of film replacement the wound roll is stretched manually on to two receiving mandrels of a processing device, and the covering film, which forms a start leader for the photographic film material here, is partly unwound and is passed through a light-tight slit in a receiver arrangement of the device. The cover of the receiver arrangement is then closed. By pulling further on the start leader, the covering film is pulled off and the photographic film material emerges from the slit. In most cases the start leader is then separated from the film and thrown away. The feeder mechanism grasps the start of the film and transports the film into the processing region of the device. The new film roll is loaded. The device is then ready for operation again. Changing the film does not necessitate a dark room.

On account of the predetermined dimensions of the receiver arrangement, an enlargement of the external dimensions of the film roll due to the packaging entity is often only permissible within narrow limits. In many processing devices the axial spacing of the receiver mandrels is in fact adjustable, so that even film formats of lesser width can be processed, but there are always limitations as regards the largest film formats. The axial length of the packaged photographic film material often only protrudes slightly beyond the available clear width of the installation space of the receiver arrangement. On account of its packaging, the photographic film material cannot then be used in this device. The permissible tolerances of the dimensions of the packaging entity can be very narrow.

More recent generations of exposure devices enable the product to be changed automatically if photographic film material is not yet situated in the supply cartridge, without photographic film material which has already been drawn into the machine being rendered unusable. A prerequisite for this purpose is that the length of film which has already been drawn into the machine can be fed back into the supply cartridge again and rewound.

This rewinding property means that parts of the packaging which remain in the device after the packaging entity has been opened must not obstruct the path of the film length.

Moreover, efforts are made to fashion the component parts of the packaging entity in as simple a manner as possible. The packaging entity should be simple and inexpensive to produce.

Efforts are also made to construct the packaging entity so that it can be separated in a simple manner into different materials and can optionally be fed to a recycling process.

Daylight packaging entities are known from EP 0 536 608 and EP 0 488 738 in which flanged discs with rigid walls cover the end faces of a cylindrical film roll. One outer edge of each flanged disc protrudes beyond the external curved cylindrical surface of the film roll. A flexible covering film which is wider than the strip-shaped photographic film material is wound under a tensile stress round the curved surface of the film roll and in lateral edge regions forms a beading arrangement round the peripheral face of this rigid side cover. The beading arrangement is created by the dilatation of the covering film, and the covering film is wound under a tensile stress round the outer curved cylindrical surface of the film roll and round the outer edge of each flanged disc. The flanged disc has to withstand the radial pressure which is generated on the dilatation of the covering film. In other words, in order to produce a light-tight closure the construction of the flanged disc has to be sufficiently stable so that it does not buckle or bulge. Depending on the material used, the flanged disc therefore has to be made with an appropriate thickness, which can result in an inadmissible size of the packaging entity. The same applies to the fixing in the winding tube also. Another disadvantage is that during the creation of the beading arrangement which is effected by dilatation, the covering film protrudes from the outer faces of each flanged disc. These protruding lateral edges often do not fulfil the requirement described above as regards the restricted spatial conditions in the processing device. A further disadvantage is that when mechanical stresses occur, for example those which act on the packaging entity during the transport of the photographic film material, this dilatation-beading technique does not always ensure imperviousness to light. The dilatation-beading arrangement sometimes comes open. The photographic film material can then no longer be used.

A film roll which is packaged for use in daylight is also known from EP 0 632 322 and U.S. Pat. No. 4,148,395. This packaging entity comprises tongue-shaped sections which are folded back on to the curved surface of the cylinders and are adhesively bonded thereto. In a packaging entity which is known from U.S. Pat. No. 4,505,387, tongue-shaped sections are adhesively bonded to the end face of the cylinder. However, it has been shown that with packaging entities of this type residues of packaging parts and of adhesive can sometimes impair the further processing of the photographic material in the processing device. Moreover, it may happen, for example when the film is to be rewound in the device, that the flexible side parts or other parts of the packaging enter the path of travel of the photographic film material. The course of processing in the device is thereby impaired.

EP 0 181 417 discloses a daylight packaging entity for strip-shaped photographic film material in which a light-tight shrink film envelops the film roll. The shrink film is designed to be of a width such that it covers the end faces, and protruding edges enter the winding tube and can be sealed there in a light-tight manner. The usability of the photographic film material is restricted due to an inadequate rewinding capacity. Moreover, wrinkles remain on the end faces after shrinkage and inadmissibly increase the axial dimension of the film roll.

A flexible tube made of hydrated fibrous material which when dry forms a close-fitting joint with rigid end discs, for use as a light-tight packaging entity for film roll which withstands tropical conditions, is known from DE 706 467.

The underlying object of the present invention is to provide a light-tight packaging entity for light-sensitive strip-shaped material such that the packaging entity does not substantially alter the axial length and the inside diameter of the film roll, such that the film can even be loaded in daylight and can be rewound without problems in the device without troublesome packaging residues remaining in the processing device, and such that the packaging entity can be manufactured economically.

This object is achieved according to the invention by a neon packaging entity and by a process for producing a packaging entity. Advantageous and preferred further forms of the invention are given in the subsidiary claims.

Provision is made according to the invention for a covering film, at least in lateral edge regions, to comprise a heat-shrinkable material which by supplying heat is shrunk on to an outer edge of rigid flange discs which are provided on both sides of the film roll. Shrinkage of the covering film is effected by supplying heat. The flange discs of rigid construction no longer have to withstand the comparatively high radial forces which occur on dilatation, but only have to withstand the shrinkage forces which are of a far lesser magnitude. The flange discs can be of comparatively thin construction. The shrunk-on joint advantageously enables the outer edges of each side cover to be enveloped free from wrinkles, i.e. the covering film is seated closely against the inner, peripheral and outer faces of the outer edge of each side cover. A beading arrangement is formed round the outer edge due to the shrinkage. The outer edge protrudes beyond the curved cylindrical surface of the roll. Imperviousness to light is thereby ensured even under mechanical stresses. The packaging entity of the strip-shaped photographic film material only results in a slight axial enlargement of the roll, and due to the rigid flange discs enables rewinding to be effected without problems. The covering film can be produced by extrusion for example, so that it is formed, at least in lateral edge regions, from heat-shrinkable material. At the same time, the covering film may consist of one or more layers. However, the covering film can also be constructed so that its heat-shrinkable lateral edge regions are adhesively bonded to a strip-shaped middle part or are welded thereto. It is essential that the covering film, at least in lateral edge regions, exhibits a shrinkage property, i.e. exhibits a material property, the effect of which is that the film contracts in this region when heat is supplied. Strips of film which exhibit this material property are known. Their shrinkage capacity can reach values greater than 50% in the direction of the strip.

The flange-shaped side covers of the packaging entity can be adhesively bonded to the end faces of the winding tube, or can be fixed in the winding tube by means of a hub-shaped projection or tube body. On account of the comparatively low shrinkage forces, this tube body can also be of very thin-walled construction. Consequently, the packaging entity according to the invention only results in a slight enlargement of the inside diameter of the wound roll.

The entire covering film advantageously consists of a shrinkable material, namely of a light-tight shrink film which is joined to the photographic film material. Light-tight shrink films are commercially available in very different forms. This form is inexpensive. Shrink films are also available as what are termed composite films. The term "shrink film" is hereinafter to be understood as a film which contracts when heated and exhibits a light-screening effect. The contraction of a shrink film is a known material property which is predetermined during the production of the film. The film is stretched and cooled during its production. The material of the film then possesses an orientation. Due to what is termed the memory effect of the material, it assumes its original state again on reheating.

According to the invention, a beading arrangement is therefore formed round the protruding outer edge of each flange disc by a heat-shrinkage joint with the covering film. The covering film is of flexible construction, whilst the flange disc is of rigid construction. The shrinking-on of the lateral edge regions of the covering film does not alter the shape of the flange disc, i.e. during shrinkage and after shrinkage the flange disc does not bulge or buckle.

The shrunk-on edge regions of the shrink film thus surround outer edge closely adjacent thereto. After shrinkage, the shrink film advantageously comprises no wrinkles. Since the seal between the side cover and the covering film can be a closely fitting one, the packaging entity is also protected from light when subjected to mechanical stresses. The axial dimension of the packaging entity is only slightly larger than the film width. The light-sensitive material is protected in a permissible manner until it is used. As mentioned above, the film roll can be loaded in daylight. After the packaging entity is opened, the rigid construction of the flange discs prevents lateral parts of the packaging entity from entering the path of the film strip. The rewind path of the film is not blocked by parts of the packaging entity which remain in the device after the packaging entity is opened. During its processing in the device, the film can change its direction of motion without problems, and can reliably be rewound on to the film roll again. The joint locations between the covering film and the side covers of the packaging entity which have to be opened do not comprise adhesively bonded locations. Consequently, no residues of adhesive remain in the processing device after the packaging has been opened. No operating problems of the processing device occur due to residues of adhesive or due to adhesively bonded tongue-shaped sections. The packaging entity can be manufactured inexpensively compared with the prior art.

It is advantageous if the covering film is coated with a heat-resistant separating layer, for example a heat-resistant lacquer. An anti-adhesion coating of this type prevents the individual layers of the covering film from becoming bonded to each other after shrinkage or from becoming welded during shrinkage.

In one preferred embodiment, care is taken that the shrunk-on covering film exerts a radial pressure on the flange disc which is less than the lowest critical loading of the flange disc. This matching of the radial pressure of the covering film to the critical loading of the side part enables the side part to be of very thin-walled construction.

In one particularly preferred embodiment, the flange disc is a plastics disc with a thickness of 0.4 mm to 1.0 mm, most preferably of polystyrene with a thickness of 0.6 mm, and has an outer edge which is enveloped by at least one layer of a covering film with a thickness of 0.05 mm to 0.2 mm, most preferably an axially pre-stretched polyethylene shrink film with a thickness of 0.07 mm to 0.08 mm. This embodiment results in a particularly inexpensive light-tight packaging entity which has considerable space-saving properties.

It is advantageous if the flange-shaped side cover is of one-piece construction and a hub-shaped projection is integrally formed on each flange disc and is mounted in and bonded to an open end of the winding tube. In this form of construction the side cover comprises a tube body. The tube body holds the side cover in the winding tube. This form of construction of the side covers can be produced inexpensively by thermoforming. The winding tube is usually a cardboard spool. In this case the packaging entity can easily be separated into different materials after the photographic film material has been used and can optionally be recycled.

In this connection, it is recommended that the thin-walled, hub-shaped projection leads into a conical section which comprises a rounded portion, and remains thin-walled as far as the end of the hub.

First of all, this conical section with the rounded portion facilitates the introduction of the side cover into the open end of the winding tube. The centring effect of the conical section is particularly desirable if said side part is to be mounted in the winding tube so that it adheres there due to a frictional fit, and therefore the outside diameter of the hub-shaped projection is 0.3 mm to 0.5 mm larger, for example, than the inside diameter of the winding tube.

It is particularly advantageous if the hub-shaped projection is coated with an adhesive, preferably with a hot-melt adhesive, on a working face situated towards the winding tube. A hot-melt adhesive, which is also termed a "hot melt", is an adhesive which only becomes tacky under the effect of heat. This means that in this particularly preferred embodiment each side part can be fixed in the open end of the winding tube by means of a heating and contact pressure tool. The working face only becomes an adhesive face when said heating and contact pressure tool heats the inner hub face of the hub-shaped projection and presses the projection on to the winding tube. Each side cover is then fixed in an open end of the winding tube by this adhesive bond.

In this connection, it is recommended that the hub-shaped projection is made of a plastics material with a melting temperature which is higher than the melting temperature of the hot-melt adhesive. It is then ensured that the adhesive becomes sticky before the plastics material melts. The projection of thin-walled construction towards the end of the hub enables the hub-shaped projection to be aligned with the cylindrical inner face of the winding tube after heating and pressing have taken place. The cone and the rounded portion, which have the desired centring effect during the installation of the side part, are moulded on to the winding tube in the form of a bushing after heating and pressing. There remains no projection in the winding tube which could unwantedly obstruct the receiving mandrel of the processing device.

Production of the side covers in the desired thin-walled construction is particularly inexpensive if each flange-shaped side cover is thermoformed and is made of polystyrene or PVC.

It is advantageous if the flange disc is designed as an annular disc of conical construction. This then acts as a disc spring. The disc spring is stressed when the packaging entity is closed. The covering film presses each annular disc on to the corresponding end face of the film roll. When the packaging entity is opened, namely when the covering film is unrolled on the insertion of the film roll and is pulled through the slit of the processing device, this spring is relieved from stress. The packaging entity frees the path of the photographic film. The flange disc forms an angle with the disc plane, which is parallel to the corresponding end face of the roll, which angle prevents the flange disc impeding the path of travel of the photographic film material on rewinding.

In this connection, an annular disc of conical construction which is recommended for most of the processing devices on the market is one which in its unstressed state forms an angle of 0.5 degrees to 3 degrees, most preferably an angle of 2 degrees, in relation to said disc plane. Unimpeded unrolling and rewinding of the photographic film material is then ensured even if there are manufacturing inaccuracies in the thermoformed side part.

It is also advantageous if each of the flange discs has a protruding shoulder on a flange face which faces away from the corresponding end face of the film roll and the height of the shoulder is at least as great as the shrunk-on covering film. Side parts of the processing device are thereby prevented from impeding the pull-off of the covering film due to a jamming effect. The shoulder acts as a spacer. It prevents the side parts of the processing device from pressing on the beading of the covering film. In this connection, the shoulder is most preferably constructed as an annular bead. A bead such as this can easily be produced by thermoforming.

The width of the covering film is advantageously more than 10 mm greater than the width of the photographic film material. When shrinkage occurs on each side of the lateral edge of the covering film, the latter is then wrapped free from wrinkles around the outer edge of the corresponding flange disc. This close-fitting shrunk-on joint is light-tight, and also improves the mechanical properties of the packaging entity, because each side cover is pressed towards the film roll.

The length of the flexible start leader most preferably corresponds to at least one circumferential length of the film roll, and is therefore wound on by more than the outer circumferential area thereof. A start leader has proved useful in practice which has a length of more than about 1.5 times the circumferential length of the film roll. The start leader is fixed centrally to the film path. The initial portion of the start leader can be fixed to the outer curved surface of the film roll by adhesive strips for example.

The tube body is advantageously made of a plastics material with a black pigmentation, of polystyrene for example. This material is fracture-resistant and can be manufactured inexpensively and with dimensional accuracy. This material is also suitable for reuse. For a wall thickness of the hub-shaped projection of 0.15 mm to 0.25 mm, the wound roll fits into all the processing devices on the market. The contact face with the receiving mandrel is flat. The film roll can easily be inserted when the film is changed. Variations in roll spool tolerances of a cardboard spool are evened out by this flexible material.

As regards the reusability of materials, it is advantageous if the winding tube and each side cover are made of plastics material and if the side parts are joined to the winding tube by a plastics weld joint.

The present invention also relates to a process for producing a light-tight packaging entity. The process is characterised in that the flange-shaped side covers are adherently mounted on the open ends of the winding tube on both sides of the film roll, the outer curved surface of the film roll is then wrapped with the covering film, which comprises a heat-shrinkable material, so that an edge region of the covering film protrudes with respect to each corresponding end face of the film roll, and finally the protruding edge regions of the covering film are heated so that they shrink in a wrinkle-free manner on to the outer edge of each flange disc.

It is advantageous in this process if the side covers are mounted by means of a heating and contact pressure tool, wherein a hub-shaped projection of each side cover is heated, is pressed on to the winding tube and is bonded thereto. This process step can be automated. A reliable, slip-resistant joint is formed between the side cover and the winding tube. Heating of the covering film is effected in accordance with the material properties of the heat-shrinkable material. The shrinkage temperatures of shrink films are between 65 to 165 degrees Celsius. A heat-shrinkable material is preferably used which has a shrinkage temperature between 120 and 130 degrees Celsius. Heat can be supplied by hot air.

The invention is explained in greater detail below with reference to examples of embodiments and to the accompanying drawings, where:

FIG. 1a is an exploded view of an embodiment of the packaging entity according to the invention;

FIG. 1b is a three-dimensional illustration of the light-tight packaging entity;

FIG. 2a is a detailed illustration of a covering film which is shrunk as a plurality of layers on to the outer edge of a flange disc;

FIG. 2b is a detailed illustration of a covering film which is shrunk as one layer on to the outer edge of a flange disc;

FIG. 3 is a sectional drawing of a preferred embodiment of a flange-shaped side cover;

FIG. 5a is a sectional illustration of a most preferred side cover before it is fixed in the winding tube;

FIG. 5b is a sectional illustration of a preferred embodiment of a side cover fixed in the winding tube; and FIG. 6 is a partial section of an opened packaging entity in a processing device.

Figure 4B:
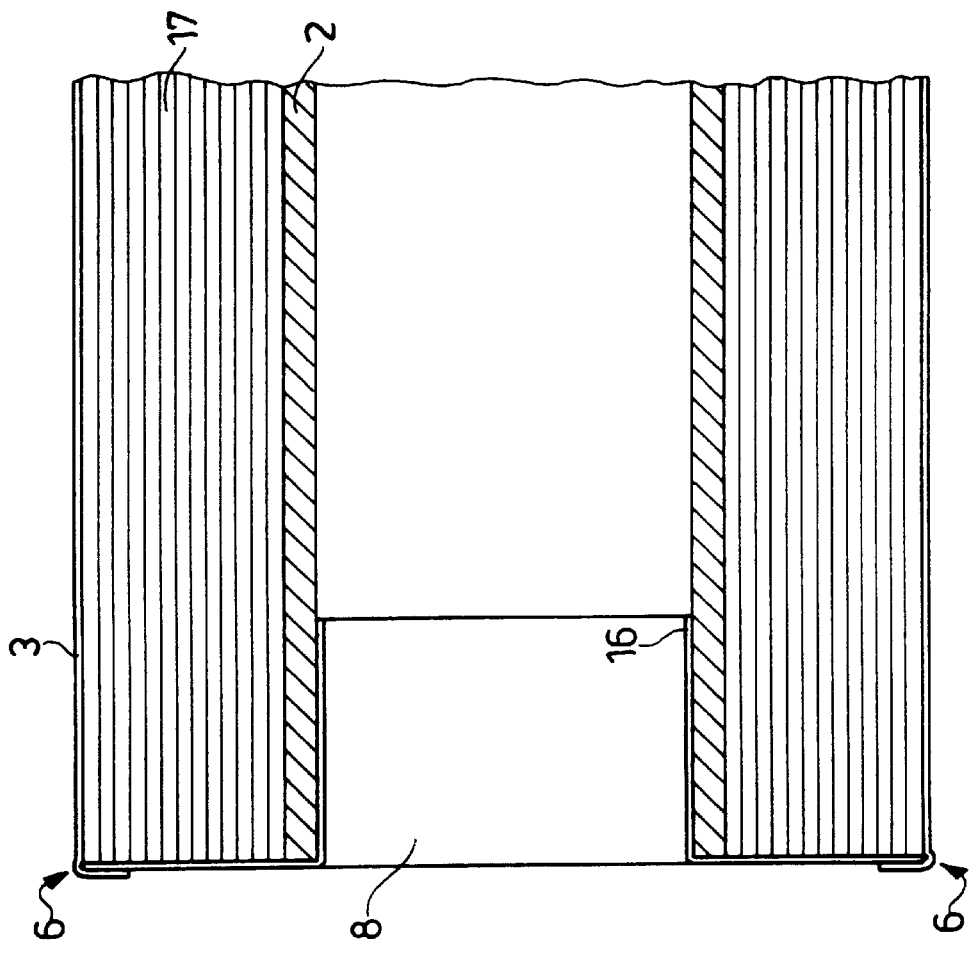
FIG. 4b is a sectional illustration of a preferred embodiment of a side cover fixed in the winding tube.

FIG. 1a is an exploded view of an example of an embodiment of the packaging entity according to the invention. FIG. 1b is a three-dimensional illustration of the closed packaging entity. The strip-shaped light-sensitive material is wound in the form of a spiral around a winding tube 2. The end faces of the film roll 1 which is thus formed are substantially flat and are each protected from incident light by a side cover 4. An opaque covering film 3 envelops the curved surface of the film roll. Together with the opaque winding tube, the light-sensitive material is protected from unwanted exposure, from moisture and from mechanical damage. Each of the side covers 4 comprises a rigid flange disc 7 with an outer edge 5. The latter protrudes beyond the curved cylindrical surface. The covering film 3 as a whole is wider than the wound strip-shaped material. The covering film, at least in lateral edge regions 6, comprises a heat-shrinkable material which is shrunk on to the outer edge 5 of each flange disc 7. The middle part of the covering film situated between the edge regions is designed so that the photographic film does not tear when the packaging entity is opened. However, the entire covering film 3 may consist of a heat-shrinkable material, and can therefore be produced as what is termed a light-tight shrink film. In the embodiment shown in FIG. 1a, a hub-shaped projection 8 is integrally formed on the side cover 4. In FIG. 3 is a sectional drawing showing the side covers 4 before they are fixed in the winding tube. The hub-shaped projection 8 forms a tube body which serves to introduce and fix the side cover 4 in an open end of the winding tube 2. Depending on the design of the packaging entity, fixation can be effected by a frictional fit or by an adhesive bond. The fixation of the tube body prevents a side cover from slipping in the winding tube when the light-sensitive material is unwound from or rewound on to the film roll in the processing device. As explained below, during the fixing operation the tube body is moulded into the open end of the winding tube by the effect of heat.

FIG. 2a and FIG. 2b are detailed illustrations of the shrunk-on covering film 3. For example, the partial section of FIG. 2a shows three layers of a covering film 3, which are shrunk round the outer edge of a rigid flange disc 7. The individual layers wrap themselves tightly and free from wrinkles round the outer edge 5 of the rigid side cover. The latter protrudes beyond the curved surface of the wound roll, i.e. the diameter of the outer edge of the flange disc is larger than the diameter 19 of the film roll. In practice, a projection of 1 to 3 mm has proved suitable. The shrunk-on lateral edge regions 6 of the covering film 3 form a U-shaped, light-tight seal between the flexible covering film and the rigid-walled side cover.

FIG. 2b shows an example of one layer of a covering film 3, the lateral edge region 6 of which is shrunk round the outer edge of a rigid flange disc 7. The shrunk-on joint is U-shaped. As FIG. 2 a also shows, this close-fitting shrunk-on joint forms a labyrinth for incident light at the edges of the flange disc. It can be seen from FIG. 2a and FIG. 2b that the covering film does not protrude from the outer end face of the flange disc after shrinkage. In other words: the packaging entity only enlarges the axial dimension of the roll on both sides by the thickness of the flange disc and by the thickness of the covering film, which can optionally be multiply-wound. It can be seen from a comparison of FIG. 2 a with FIG. 2 b that a light-tight seal is even obtained if the roll diameter 19 varies slightly. The heat-shrinkable material always wraps itself in a close-fitting manner, particularly on the annular face of the flange disc which faces away from the film roll. The film not only shrinks in the longitudinal direction of the strip, but also shrinks transversely to the strip. Consequently, the shrunk-on joint presses this annular face towards the end face of the roll. The width of the covering film 3 is advantageously selected so that its lateral edges are situated on a peripheral circle, the diameter 18 of which is smaller than diameter 19 of the film roll. The packaging entity is then reliably light-tight even under a mechanical stress, since the shrink film presses the flange disc towards the end face of the film roll.

FIG. 3 is a sectional drawing of a flange-shaped side cover before it is fixed in the winding tube. The flange disc 7 is constructed here as a conical annular disc which acts as a disc spring: the disc spring is stressed when the packaging entity is closed (FIG. 4b and FIG. 5b). The disc spring is relieved from stress when the covering film is unwound. FIG. 6 illustrates an opened packaging entity in a processing device. The relief from stress of the disc spring when the packaging entity is opened causes the conical flange disc to move away from the end face of the film roll. As illustrated in FIG. 3, in its unstressed state the disc face of the flange disc 7 forms an angle 13 with the disc plane 20. An angle of 0.5 degrees to 3 degrees is preferred. Manufacturing inaccuracies in the side cover are thereby compensated for and do not impair the unwinding or rewinding of the light-sensitive material. As illustrated in FIG. 3, the hub-shaped projection comprises a conical section 9 and ends in a rounded portion 10. The rounded portion and the cone have a centring effect when a side cover is introduced into the open end of a winding tube. The side cover is preferably made in one piece from plastics material by thermoforming. The projection 8 is coated with adhesive 12 on a working face 11. The coating can be applied as an annular coating or at discrete points. During the fixation of the side cover, the hub-shaped projection 8 is then heated in the interior of the hub by means of a heating and contact pressure tool which is not illustrated. The plastics material of the projection 8 becomes heated, and the hot-melt adhesive becomes tacky. The contact pressure tool presses the hub-shaped projection against the inner curved surface of the winding tube. The cone 9 and the rounded portion 10 are widened and are formed into a bushing, and after the fixing operation are seated against the curved surface of the winding tube. The reshaped hub end 16 is aligned with the curved cylindrical surface (FIG. 4b and FIG. 5b). Due to the hub end 16 which is reshaped in this manner, there is no projection in the winding tube which could impair the insertion of the film roll in the processing device. Due to the heat supplied, the active face 11 becomes an adhesive face by means of which the side cover 4 is adherently mounted in the winding tube 2. The tube body is thereby incapable of rotating in the winding tube. A reliable transmission of torque in the processing device is ensured. The thin-walled construction of the hub-shaped section is firstly desirable due to the space limitations described above, and secondly permits more rapid heat transfer to the hot-melt adhesive. This rapid heat transfer shortens the time of assembly.

Figure 4A:
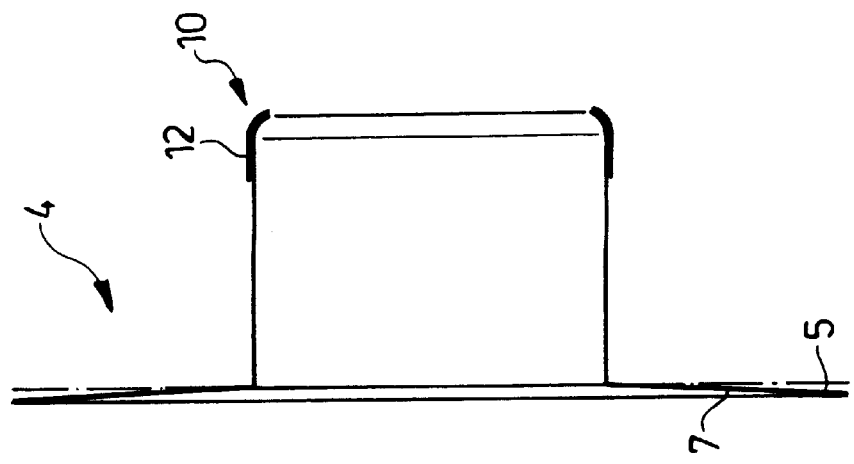
FIG. 4a is a sectional illustration of a preferred side cover before it is fixed in the winding tube.

FIG. 4a is a sectional illustration of a preferred side cover 4 before it is fixed in the winding tube as explained above. The partial section of FIG. 4b shows the closed packaging entity.

An embodiment of a side cover which is particularly preferred is illustrated in FIG. 5a and FIG. 5b. The side cover 4 has a protruding shoulder 14 which serves as a spacer in the processing device. It prevents the receiving mandrel 15 of the processing device from pressing on the end face of the beaded covering film. The covering film can thereby not become jammed in the receiver arrangement of the processing device. This relief from pressure makes it easier to pull off covering film, and therefore makes it easier to open the packaging entity. The shoulder 14 is preferably constructed as a bead.

FIG. 6 is a partial section through an opened packaging entity in a processing device. The spring force of the disc spring causes the flange discs to free the path of the strip for the light-sensitive material. Reliable rewinding in the processing device is ensured due to the flange discs being oriented away from the photographic film on both sides of the end face thereof.

As explained at the outset, according to the present invention the covering film of the packaging entity, at least in lateral edge regions, comprises a heat-shrinkable material which is shrunk on to the outer edge of each flange disc. For example, the covering film can be designed so that its lateral edges consist of heat-shrinkable material and are bonded to a non-shrinkable film middle part. In the latter embodiment, the film middle part can be matched as regards its resistance to tearing to the forces which arise when pulling off the covering film. The covering film can be what is termed a mono-film or can be a composite film. It is also possible to use heat-insulating material for the film middle part. The packaging entity can thereby also be used for photographic materials which are very sensitive to heat.

The rigid side cover can also of course consist of a composite material, for example an aluminium-plastics material composite. The packaging entity is of course by no means restricted to photographic film materials, but is also suitable for the packaging of light-sensitive plastics materials, such as for example photopolymers for example, which are supported on a strip-shaped backing film.

In another possible form of construction, the hub-shaped projection of the side cover is welded to the winding tube.

What is claimed is:

1. A light-tight packaging entity comprising
   a winding tube with open ends,
   a length of light-sensitive strip-shaped material wound in the form of a spiral around the winding tube forming a hollow cylindrical film roll with substantially flat end faces and an outer curved surface,
   a pair of flange-shaped side covers each comprising a rigid flange disc with an outer edge, the diameter of which is larger than the diameter of the outer curved surface of the film roll and each of which screens an end face from light,
   a flexible covering film wider than the strip-shaped material enveloping the outer curved surface of the film roll and the outer edge of each side cover to screen the strip-shaped material and the side covers from light,
   wherein the covering film at least in lateral edge regions comprises a heat-shrinkable material shrunk onto the outer edge of each flange disc,
   and wherein the covering film is coated with a heat-resistant separating layer for preventing welding of individual layers of the covering film on shrinkage.

2. A packaging entity according to claim 1 wherein the covering film is a shrink film which forms a start leader for the light-sensitive material and surrounds the outer edge as a wrinkle-free, close-fitting, shrunk-on joint.

3. A packaging entity according to claim 1 wherein the shrunk-on covering film exerts a radial pressure on the flange disc which is less than a lowest critical loading of the flange disc.

4. A packaging entity according to claim 3, wherein the flange disc is formed from a plastics disc with a thickness of 0.4 mm to 1.0 mm, and the outer edge thereof is enveloped by at least one layer of the covering film with a thickness of 0.05 mm to 0.2 mm.

5. A packaging entity according to claim 1, wherein each flange-shaped side cover is of one-piece construction and a hub-shaped projection is integrally formed on each flange disc mounted adherently in an open end of the winding tube.

6. A packaging entity according to claim 6 wherein the hub-shaped projection is thin-walled and leads into a conical section comprising a rounded portion.

7. A packaging entity according to claim 6 wherein the hub-shaped projection is coated with a hot-melt adhesive on a working face situated towards the winding tube.

8. A packaging entity according to claim 8 wherein the hub-shaped projection is made of a plastics material with a melting temperature higher than the hot-melt adhesive.

9. A packaging entity according to claim 6 wherein each flange-shaped side cover is thermoformed of polystyrene or PVC.

10. A packaging entity according to claim 6 wherein the flange disc is designed as an annular disc of conical construction which acts as a disc spring.

11. A packaging entity according to claim 10 wherein in an unstressed state the annular disc of conical construction forms an angle of 0.5 degrees to 3 degrees in relation to a disc plane.

12. A packaging entity according to claim 6 wherein the flange disc has a protruding shoulder on a flange face which faces away from a corresponding end face of the film roll and the height of the shoulder is at least as great as the shrunk-on covering film.

13. A packaging entity according to claim 1, wherein each lateral edge of the shrunk-on covering film is situated substantially on a peripheral circle, the diameter of which is at least 5 mm smaller than the diameter of an outer edge of the outer curved surface of the film roll.

14. A packaging entity according to claim 1 wherein each side cover is joined to the winding tube by means of a plastics weld joint.

15. A process for producing a light-tight packaging entity for a strip-shaped light-sensitive material comprising the steps of:

taking a winding tube with open ends, winding a length of light-sensitive strip-shaped material in the form of a spiral around the winding tube to form a hollow cylindrical film roll with substantially flat end faces and an outer curved surface, mounting a pair of flange-shaped side covers to the open ends of the winding tube, each of which comprises a rigid flange disc with an outer edge, the diameter of which is larger than the diameter of the outer curved surface of the film roll and each of which screens an end face from light, enveloping the outer curved surface of the film roll and the outer edge of each side cover with a flexible heat shrinkable covering film wider than the strip-shaped material to screen the strip-shaped material and side covers from light, a) the flange-shaped side covers are adherently mounted on the open ends of the winding tube on both sides of the film roll;

b) heat shrinking the covering film so that an edge region of the covering film protrudes with respect to each corresponding end face of the film roll;

heating the protruding edge regions of the covering film so that they shrink in a wrinkle-free manner onto the outer edge of each flange disc, and coating the covering film with a heat-resistant separating layer preventing welding of individual layers of the covering film on shrinkage.

\* \* \* \* \*

UNITED STATES PATENT AND TRADEMARK OFFICE
CERTIFICATE OF CORRECTION

PATENT NO. : 6,095,330
DATED : August 1, 2000
INVENTOR(S) : Hermann August Essert and Steffen Peter Mühlbach It is certified that error appears in the above-identified patent and that said Letters Patent is hereby corrected as shown below:

Column 1,
Line 2, "according to the" should be deleted;

Claims,
Column 10,
Line 35, "6" should read -- 5 --.
Line 38, "6" should read -- 5 --.
Line 42, "8" should read -- 7 --.
Line 45, "6" should read -- 5 --.
Line 49, "6" should read -- 5 --.
Line 57, "6" should read -- 5 --.

Signed and Sealed this

Eleventh Day of September, 2001

Attest:

NICHOLAS P. GODICI
*Attesting Officer*          *Acting Director of the United States Patent and Trademark Office*